(12) United States Patent
Harman (10) Patent No.: US 6,473,115 B1
(45) Date of Patent: Oct. 29, 2002

(54) MULTIPLE VIEWER SYSTEM FOR DISPLAYING A PLURALITY OF IMAGES

(75) Inventor: Philip Victor Harman, Scarborough (AU)

(73) Assignee: Dynamic Digital Depth Research Pty Ltd, Bently (AU)

( * ) Notice: Subject to any disclaimer, the term of this patent is extended or adjusted under 35 U.S.C. 154(b) by 0 days.

(21) Appl. No.: 09/205,563

(22) Filed: Dec. 4, 1998

Related U.S. Application Data (63) Continuation of application No. PCT/AU97/00353, filed on Jun. 4, 1997.

(30) Foreign Application Priority Data

Jun. 4, 1996 (AU) .............................. PO 0246

(51) Int. Cl.[7] .......................... H04N 13/04; H04N 15/00
(52) U.S. Cl. .......................................... 348/51; 348/53
(58) Field of Search ............................... 348/42, 47–50, 348/51–60; 359/376, 463–477, 629–630; 345/9, 31–32, 139; 342/176, 180; 353/74, 77, 79, 82, 84, 89, 98

(56) References Cited

U.S. PATENT DOCUMENTS

| | | | |
|---|---|---|---|
| 2,727,429 A | 12/1955 | Jenkins | 352/89 |
| 4,100,572 A | 7/1978 | Perisic | 348/51 |
| 4,315,240 A | 2/1982 | Spooner | 348/123 |
| 4,649,425 A | 3/1987 | Pund | 348/52 |
| 5,189,452 A | 2/1993 | Hodson et al. | 353/94 |
| 5,311,220 A | 5/1994 | Eichenlaub | 348/55 |
| 5,320,538 A | 6/1994 | Baum | 340/573.1 |
| 5,349,379 A | 9/1994 | Eichenlaub | 348/59 |
| 5,483,308 A | 1/1996 | Youngker et al. | 359/459 |
| 5,661,599 A | 8/1997 | Borner | 359/463 |
| 5,671,992 A * | 9/1997 | Richards | 353/98 |

FOREIGN PATENT DOCUMENTS

| | | | |
|---|---|---|---|
| EP | 0354851 A2 | 8/1989 | |
| EP | 0601308 | 6/1994 | |
| EP | 0607000 | 7/1994 | |
| GB | 2041562 | 12/1979 | |
| GB | 2041563 | 12/1979 | |
| GB | 2115178 | 12/1979 | |
| GB | 2201069 | 1/1988 | |
| GB | 2259213 | 8/1991 | |
| JP | 63018213 | 1/1988 | |
| JP | 63121387 | 5/1988 | |
| JP | 64-021415 | 1/1989 | |
| WO | WO94/06249 | 3/1994 | |
| WO | WO94/20875 | 9/1994 | |
| WO | WO94/24601 | 10/1994 | |
| WO | WO 94/25899 | 11/1994 | |
| WO | WO 96/18925 | 6/1996 | |
| WO | wo 97/46912 | * 12/1997 | ............ H04N/5/74 |

OTHER PUBLICATIONS

Petro Vlahos, "The Front Projection Process of Composite Photography", British Kinematography Sound and Television, vol. 54, Jan. 1972, pp. 14–19.

Patent Abstracts of Japan, P–869, p. 83, JP 1–21435 A (Sony Corp) Jan. 24, 1989.

"Head Tracking Stereoscopic Display", IEEE Transactions on Electron Devices, vol. Ed–33, No. 8, Aug. 1986, pp. 1123–1127.

* cited by examiner

*Primary Examiner*—Vu Le
(74) *Attorney, Agent, or Firm*—Banner & Witcoff, Ltd.

(57) ABSTRACT

A system for displaying a plurality of images to multiple viewers (V1, V2, V3, . . . , VN) includes at least one semi-reflective mirror (12), a retroreflective screen (15) and a plurality of optical imaging means (not shown), each viewer being provided with a respective optical imaging means, each optical imaging means including a projection means for projecting images along an optical path, a tracking means (not shown) to determine the spatial position of the respective viewer's eyes, and a focusing means (not shown) to modify the optical path in response to movement of the respective viewer (V1, V2, V3, . . . , VN).

16 Claims, 9 Drawing Sheets

MULTIPLE VIEWER SYSTEM FOR DISPLAYING A PLURALITY OF IMAGES

This application is a continuation of International Application Serial No. PCT/AU97/00353, filed Jun. 4, 1997, which, in turn, claims priority to Australian Application Serial No. PO 0246, filed Jun. 4, 1996, the entire contents of which are incorporated herein by reference.

The present invention is generally directed to a multiple viewer image viewing system capable of providing a plurality of images to viewers and/or a three dimensional (3D) visual effect in a viewed image.

With the advent of multiple player video arcade games it has been desirous to provide a system capable of presenting a plurality of 2D images to a plurality of viewers. Such a system could also be utilised in a number of other areas, for example in education and training. Currently such a system can only be achieved by supplying each of the viewers with their own display system which depicts the image to be seen by that viewer on a separate screen. It will be appreciated that the provision of multiple display systems is costly both in terms of money and real estate.

There have also been numerous attempts to produce, a system capable of producing a real 3D image which can be viewed by the naked eye, and preferably one that can be viewed by a plurality of viewers.

One of the present applicants prior attempts to provide an autostereoscopic display system resulted in that disclosed in Australian Patent Application No. 66718/94. This system did enable a viewer to see a stereoscopic image without the need for special glasses or the like. However, this system did have a number of limitations.

It has been found that the Applicants earlier system was practically only suitable for a single viewer. In order to maintain a 3D effect it is essential that the left and right eyes of the viewer see the respective left and right images of the stereoscopic image. This is required even when the position of the viewers eyes vary through movement of the viewer. The Applicants earlier system maintained the stereoscopic image by moving the semireflective mirror and projection system in response to detected movements of the viewer effectively resulting in the viewing apparatus being fixed with respect to the viewer. That is, in order to maintain the stereoscopic image for the viewer the screen, mirrors and projectors had to be moved. The requirement to maintain these elements in the correct orientation required expensive componentry in order to effect smooth movements to limit any distractions to the viewer, and also made it inherently difficult for more than a single viewer to use the system. In fact, as the semireflective mirror was required to be moved to maintain the stereoscopic effect for one viewer, it was practically impossible for that semireflective mirror orientation to be suitable for another viewer to see a stereoscopic image.

Further as the semireflective mirror was required to be continuously moved, it necessarily formed part of the viewing apparatus and was enclosed in such. Because the semireflective mirror was enclosed it meant that the semireflective mirror and screen size was also limited for practical reasons.

The Applicants earlier system also required that the viewer be located at a relatively fixed distance from the screen in order to work effectively. Whereas it is desirable to allow the viewer to view the image at varying distances from the screen. Further, because of the limited screen size the viewer was required to be within a meter of the screen for best effect further making the addition of multiple viewers difficult.

It is therefore an object of the present invention to provide a display system overcoming at least one of the above noted problems.

With this in mind there is provided a multiple viewer display system including at least one semi reflective mirror, a retroreflective screen, and a plurality of optical imaging means, each viewer being provided with a respective said optical imaging means, each optical imaging means including a projection means for projecting images along an optical path, a tracking means to determine the spatial position of a respective viewers eyes, and a focussing means to modify the optical path in response to movements of the respective viewer.

In order to provide a stereoscopic image the projection means may be adapted to project left and right eye images along the optical path. In this way the present invention may be adapted to provide an autostereoscopic display system.

The display system may also include a plurality of semi reflective mirrors, so that multiple viewers are not required to view an image through a single mirror. Although it will be appreciated that a single semi reflective mirror could be large enough to accommodate a plurality of viewers, in some instances it may be more practical to provide a plurality of semi reflective mirrors. Of course it is not necessary that the number of semi reflective mirrors equal the number of viewers, although such an arrangement may be preferred.

In another preferred embodiment the retroreflective screen would be located above the viewers, for example on the ceiling, as opposed to more conventional arrangements whereby the screen must be located in front of the viewers.

The display system of the present invention can provide an improved 3D image that is relatively cheaper and allows the viewers to be in variable locations. Further the present invention allows for multiple viewers to be using the same screen without necessarily viewing the same image. That is, one advantage of the multiviewer arrangement of the present invention is that multiple viewers need not see the same image, even though they are looking at the same screen. The ability to have a single screen depicting different images to different viewers is especially advantageous in the video game market.

Further, it is possible that the spatial position of one image on the screen may overlap with the spatial position of at least one other image on the screen, yet still enable each viewer to view their respective image without any substantial interference.

It will be appreciated that if the image seen by both the left and right eyes are the same, then the viewer will see a 2D image. Hence, the present invention can provide both 2D and 3D images, by either providing the same image to both eyes of a viewer, or alternatively providing left eye and right eye images to the respective left and right eyes of a viewer.

It will be convenient to further describe the invention by reference to the accompanying drawings which illustrate possible embodiments of the invention. Other embodiments of the invention are possible and consequently the particularity of the accompanying drawings is not to be understood as superseding the generality of the preceding description of the invention.

FIG. 4b shows a sub-element of the retroreflective screen of FIG. 4a.

For convenience we will now explain some of the common terms used in this specification. However these explanations do not seek to limit the generality of the functions each element performs in the invention.

Standard television sets are capable only of producing a single two dimensional (2D) image, that is an image that has only two dimensions, horizontal (X) and vertical (Y). For 3D images an extra dimension of depth is added to 2D images by using the major depth cues of retinal disparity, convergence, accommodation and motion parallax.

A digital micro-mirror device (DMD) refers to a binary spatial light modulator as developed at Texas Instruments, USA. The DMD consists of an array of movable micro-mirrors functionally mounted over a CMOS SRAM. Each mirror is independently controllable and is used to modulate reflected light, mapping a pixel of video data to a pixel on display. The micro-mirrors are electrostatically controlled with light being reflected from the ON mirror elements though a projection lens.

Interocular Distance refers to the distance between the viewer's eyes. Normally measured at 65 mm although this distance may require modification for some viewers.

KALA filter refers to a filter as presently produced by COLORLINK, USA.

A lenticular lens generally consists of a series of vertically oriented semi-cylindrical lenses located side by side to form an optical viewing panel whereby each lense forms dual images one for the left eye and one for the right eye.

A retro reflective screen is any flat or curved surface that reflects back incident light at substantially 180 degrees to the incident angle. It may consist of a series of miniature spherical or cubicle glass beads sandwiched between two layers of plastic polymer film to form a large flat mirror. This type of screen has typical gains of 10,000–16,000 therefore low-cost low intensity projection systems may be used.

A semi-reflective mirror consists of a flat piece of transparent medium that has on one of its surfaces a partial mirror giving it the property of being partially reflective and partially transmissive. Such a mirror is located between the viewer and the retro reflective screen and between the Optical Focusing System and the retro reflective screen. This is an essential item to the display system as the properties of the retro reflective screen only allow light to be reflected directly back to the projection source. Therefore the semi reflective mirror effectively allows the viewer's eyes to be located on the same optical axis as the projected light allowing the viewer to benefit from the special characteristics of the retro-reflective screen.

Referring now to the Figures. As previously stated the display system consists of plurality of optical imaging means. Each optical imaging means directs projected light to a retro-reflective screen (15) via at least one semi reflective mirror (12). The projected images are directed back along the incident path through the semi-reflective mirror (12) again to produce left and right images (for a stereoscopic effect) to regions corresponding to the viewers eyes. The optical imaging means includes three main components, being a projection means (3), a tracking means (2) and a focussing means (1).

Figure 1A:
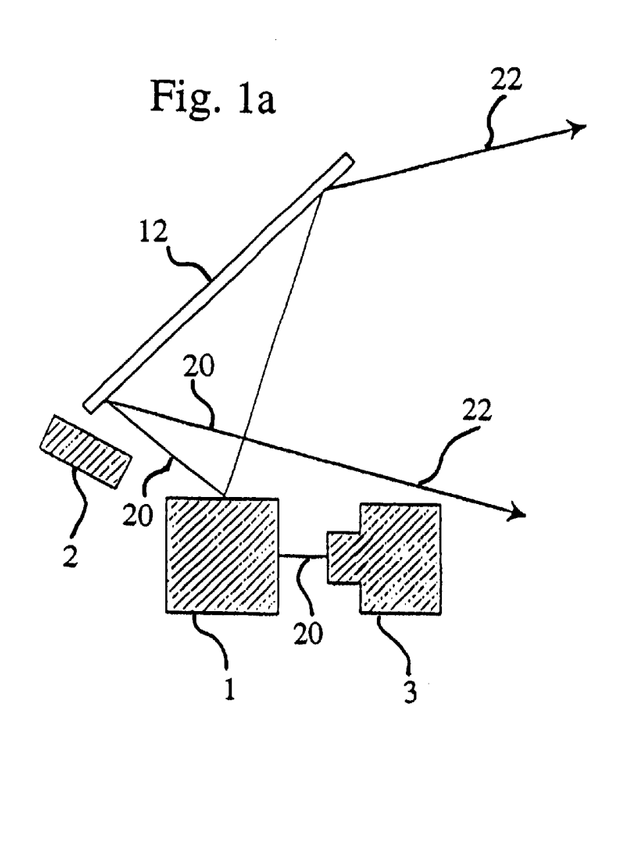
FIGS. 1a and 1b show an imaging system overview.
Figure 1B:
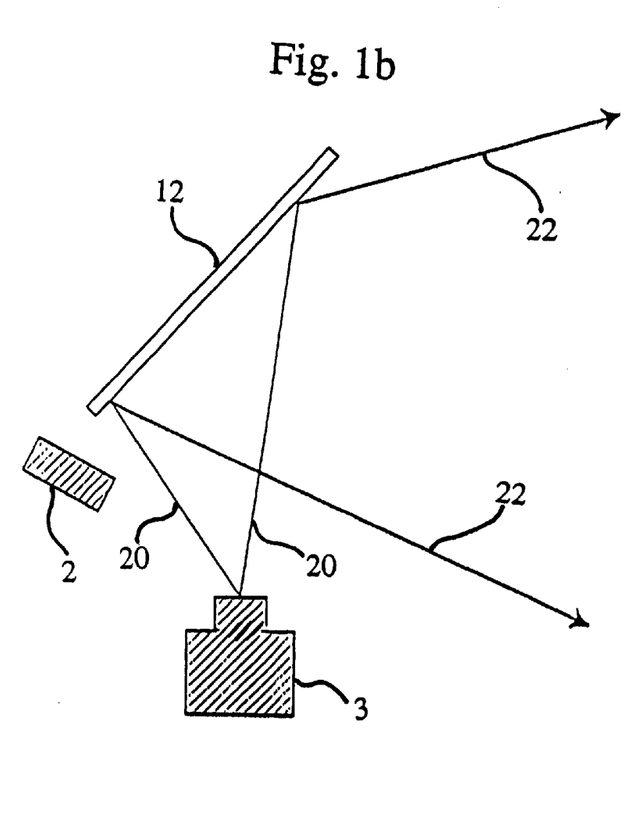
Figures 2A, 2B:
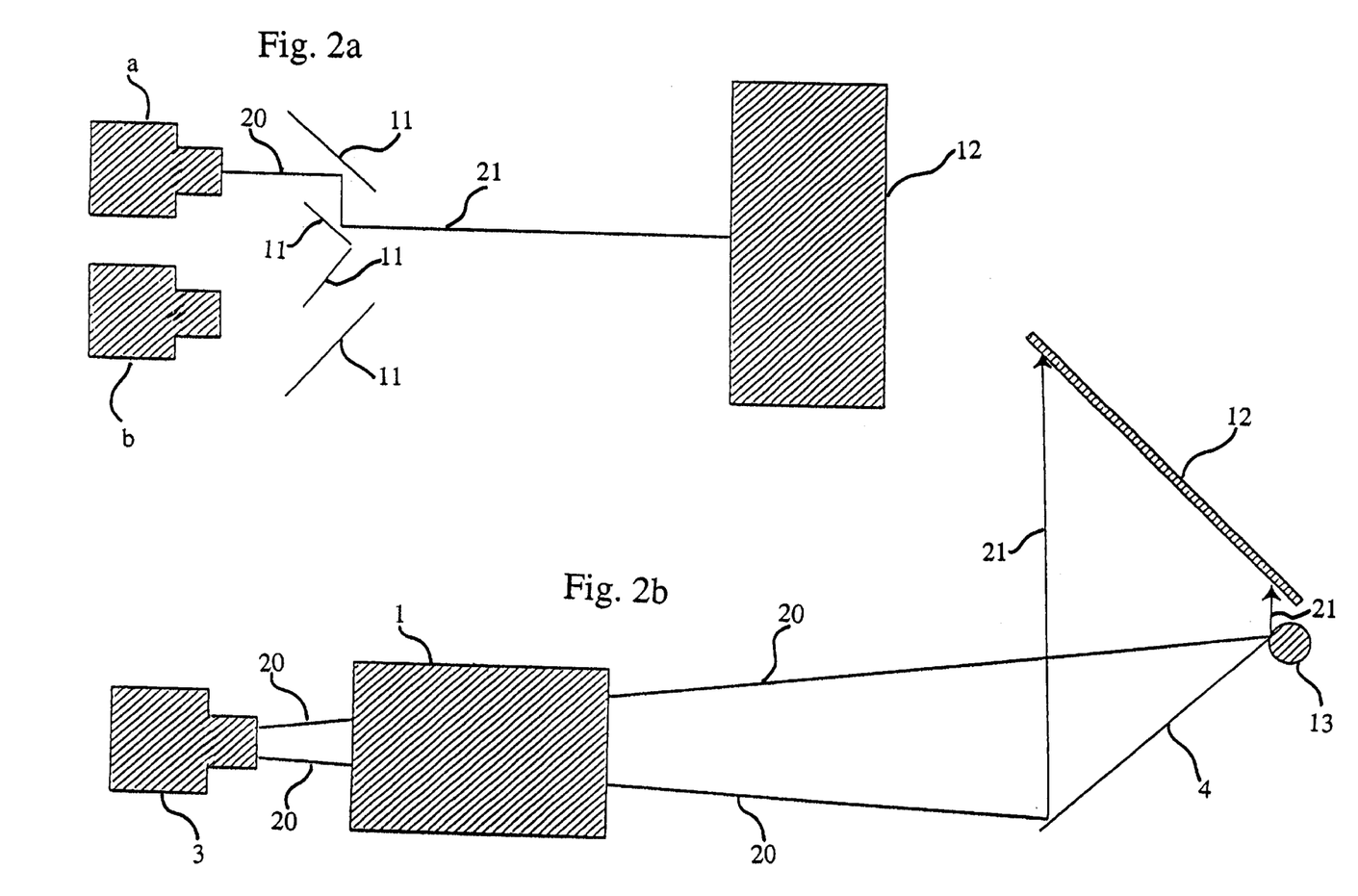
FIG. 2a shows a top view of an imaging system.
FIG. 2b shows a side view of an imaging system.
Figure 3:
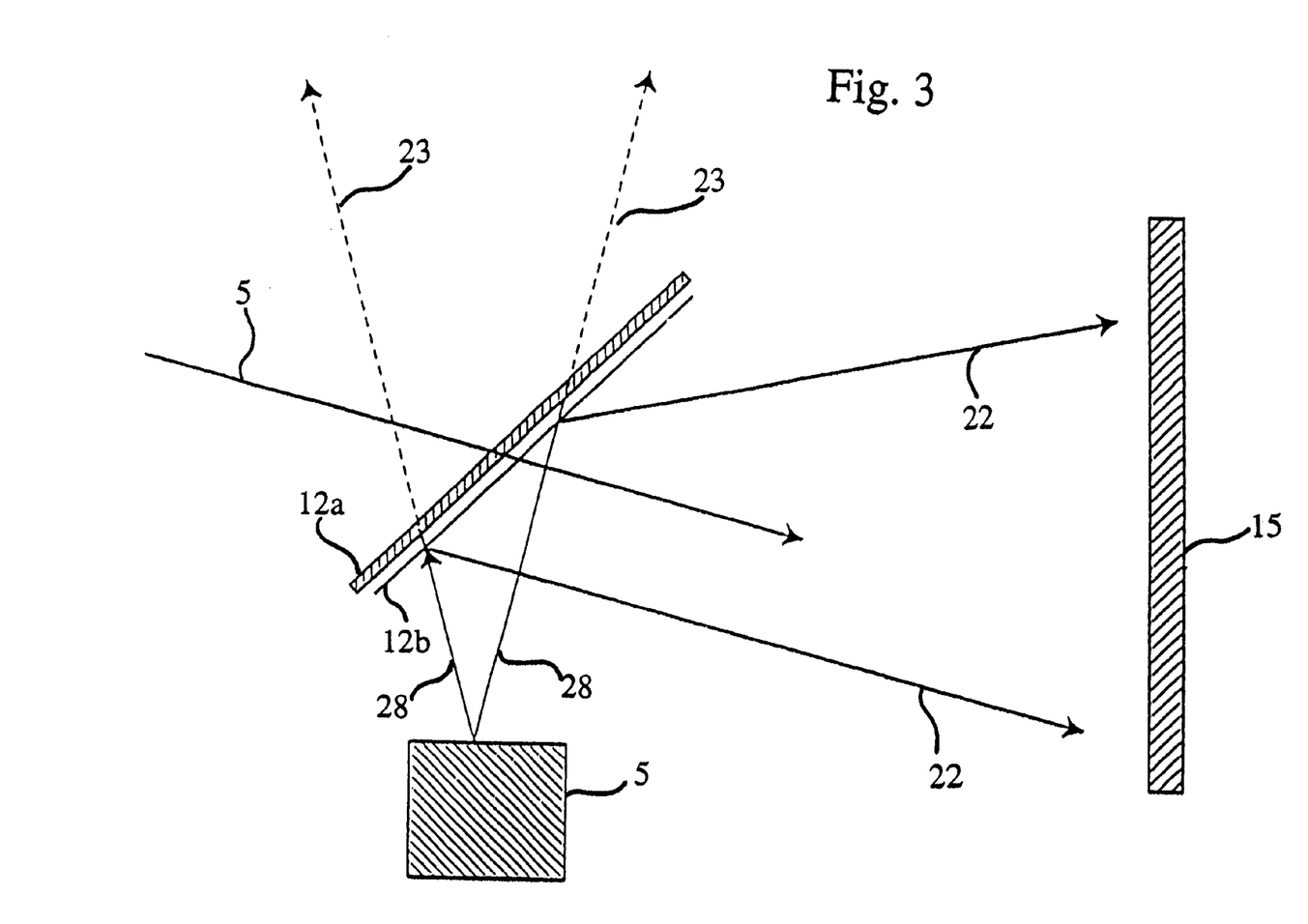
FIG. 3 shows the operation of a semireflective mirror.

As can be seen in FIGS. 1a and 1b, the orientation and location of the projection means (3) relative to the semi-reflective mirror (12) is not essential to the invention, and a suitable focusing means (1) can be included to direct the projected light (20) from the projection means (3). The position and orientation of the projection means (3) will be largely determined by design criteria and space requirements. The focusing means (1) could comprise a mirror arrangement, be included with the projection means (3), or some other arrangement know to the skilled addressee. What is important is that the light (20) projected from the projection means (3) be directed according to the position of the viewers eyes, and whether this is achieved through mirrors reflecting the light, or motors moving the projection means for example is irrelevant to the present invention.

The projection system (3) can consist of a light source or sources and a method of forming stereoscopic image pairs in the 3D arrangement. These image pairs can be formed by a number of methods including using dual video projectors mounted so that the optical focussing system (1) can optimise their projected light to form an image pair.

Alternatively a single monochromatic light source can be used projecting at substantially 45 degrees to a holographic optical element (HOE) that is mounted behind a LCD panel. The LCD panel operates in a line sequential or time division multiplexed mode to enable two projected image zones to be produced and projected through the lens. Modification of the position of the light source may alter the position of the image zones providing a method for maintaining the images over the viewer's eyes when combined with an eyetracking means (2).

The image pairs can also be created by using a high powered, high resolution monochromatic CRT projector operating into a beam splitter forming two light paths, one for each respective eye of the viewer which are then directed through two KALA filters one for each side, to apply the chroma aspect to the images.

Alternatively, a monochromatic light source is reflected from a digital micro mirror device (DMD), as manufactured by Texas Instruments, USA, defining the same function as the single CRT projector.

A further means of creating the image pairs is by using dual high powered, high resolution monochromatic CRT projectors operating in a configuration to form two substantially parallel light paths, one for each respective eye of the viewer. These are then directed through two KALA filters, one for each side, to apply the chroma aspect to the images.

Alternatively, dual monochromatic light sources are reflected from dual digital micromirror device (DMD), and then passed through two KALA filters to form two independent projected images as per the dual CRT projector.

Yet a further means of creating the image pairs is by using a pair of LCD panels mounted with their centres at substantially 65 mm apart, being the common interocular distance, or a single LCD panel that can be divided electronically into two image zones. The LCD panel or panels are mounted over a single monochromatic light source and further collimated by lenses to provide two projected images. Movement of the LCD panel either mechanically or electronically provides a method of maintaining the images over the viewer's eyes when combined with an eyetracking means.

Alternatively, a monochromatic light source can be projected through an LCD panel that is located directly behind a lenticular lense forming two image zones. Mechanical movement of the lenticular lense then provides a method of maintaining the images over the viewer's eyes when combined with an eyetracking means.

If a 2D image is required to be viewed by the viewer then both the left and right eye images must be the same. This could be achieved by projecting two identical images to the left and right eyes, or alternatively by projecting a single image which covers both eyes of the viewer.

In one illustrative implementation, the focussing means (1) includes a plurality of mirrors (11) and lenses that have their positions mechanically or electrically modified to allow the redirection of the light path of the projected image pair so that they remain over a region corresponding to the viewer's eyes, even when the viewer moves position. The focussing means (1) allows for changes in requirements of convergence or divergence of the image pair and for alteration of the interocular distance of the viewer's eyes as the viewer position or distance from the imaging system changes. This could be further enhanced through the use of a mirror (4) mounted on a hinge (13) and capable of movement to adjust the light path from the projection means (3) to the semi-reflective mirror (12).

In an illustrative alternative implementation, the focussing means (1) incorporates a mechanical or electric servo mechanism to allow spatial displacement of the focussing components to provide for "x", "y" or "z" positioning of the projected images to a region corresponding to the viewer's eyes. This is also the case for 2D viewing wherein the single image or identical left and right eye images are still required to be directed towards the eye of the viewer. Feedback from an eyetracking system defines the position of the viewer's eyes.

The tracking means (2) simply refers to a system whereby the position of the viewer's eyes can be tracked continuously. One such means would be to provide a panel of widely spaced IR LED's around the border of the semi-reflective mirror (12). The IR LED's could project IR light at, for example, 880 nm, which would not be seen by the viewer, but would cause a reflection from the viewers eyes that could be detected by an eyetracking camera (2). By knowing the position of the viewers eyes the projected images can be accurately directed to the respective eyes of the viewer.

The video camera used in the tracking means (2), may be a CCD or vidicon type, the lens of which is fitted with an infrared bandpass filter. The viewers face is illuminated with infrared, the source of which may consist of an array of infrared LED's. For situations where the viewer is wearing corrective glasses, the LED array may typically consist of strips of LED's such that a unique pattern of infrared light is formed on the viewers glasses. The image of the viewers face obtained from the video camera is then processed to identify the x and y coordinates of the pattern of reflections on the viewers glasses. Where the viewer does not wear glasses then a single or multiple LED infrared illuminating source may be used. In this case, reflection of this illumination source from the viewers cornea may be used to determine the x and y location of the viewers eyes.

The focused images from the projection means (3) are directed towards a semi-reflective mirror (12). A semi-reflective mirror (12) is an optical element that has a partial mirror (12b) on one side which is partially reflective and partially transmissive, and a glass or transparent sheet (12a) on the other side. Unreflected light (23) passes thus passes through the semi-reflective mirror (22). The size of the semi-reflective mirror (12) is determined by the size of the retroreflective screen (15) and by the distance the viewer is located from the semi-reflective mirror (12), and is conveniently mounted at substantially 45 degrees to the plane of the retro-reflective screen (15). The line of sight (24) of the viewer (26) is thus through the semi-reflective mirror (12).

An ideal semi-reflective mirror (12) would allow light to pass directly through the mirror without any loss or refraction from one side, and reflect all light directed at the mirror from the other side. The projected light (20) thus is reflected by the semi-reflective:mirror (12) as reflected light (22). In practice, some loss is experienced, however, what is required is that the semi-reflective mirror (12) allows sufficient light (28) from the light source (5) to be reflected by the semi-reflective mirror (12) to the retroreflective mirror (15), and still enable the viewer (26) to look directly through the semi-reflective mirror (12) to view the image.

Figure 4A:
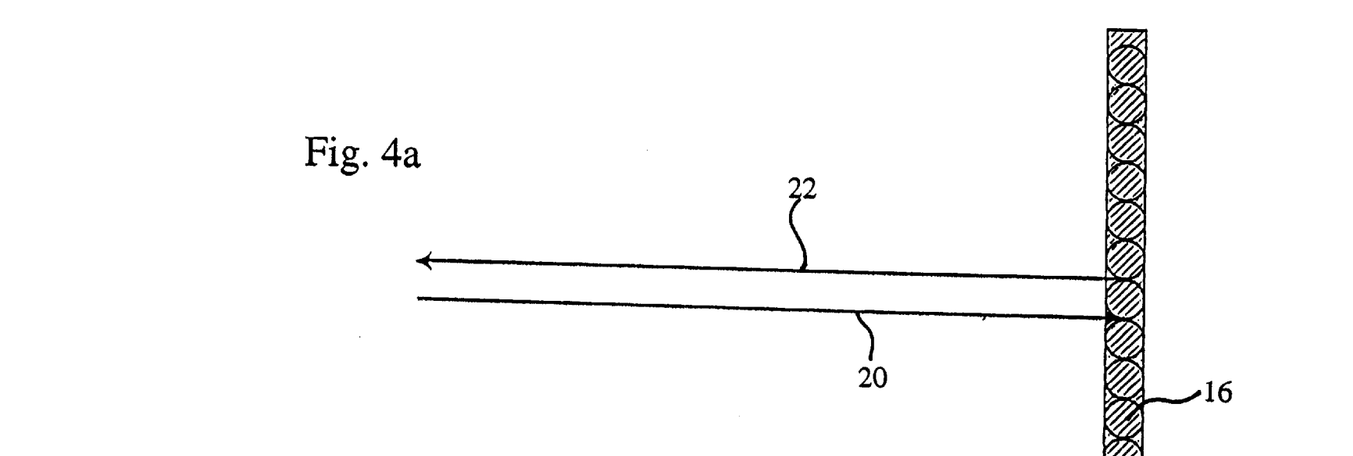
FIG. 4a shows a construction of a retroreflective screen.
Figure 4B:
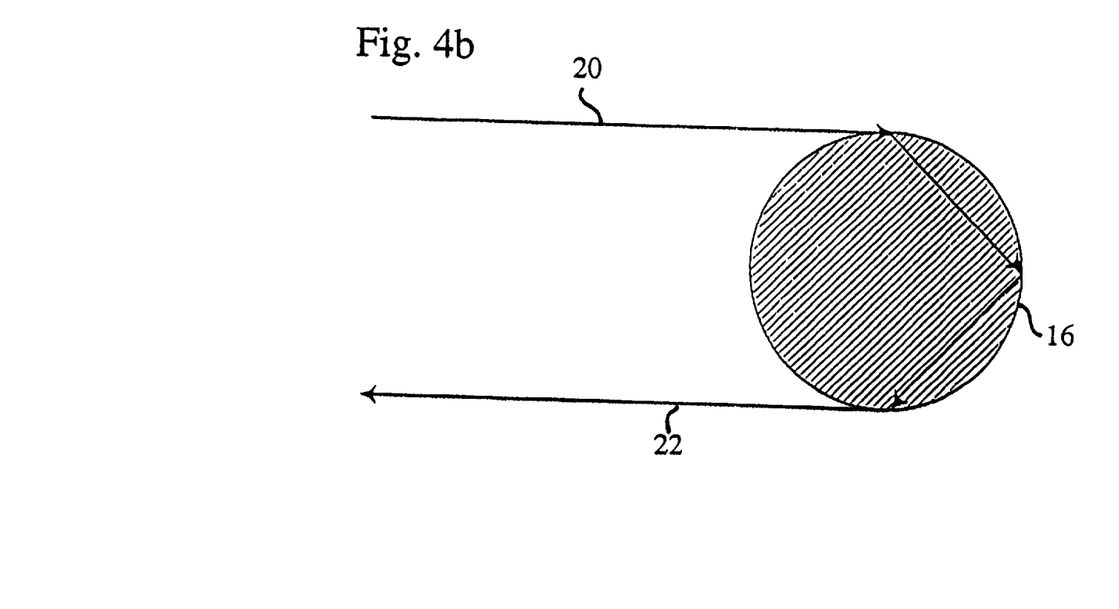
Figure 5:
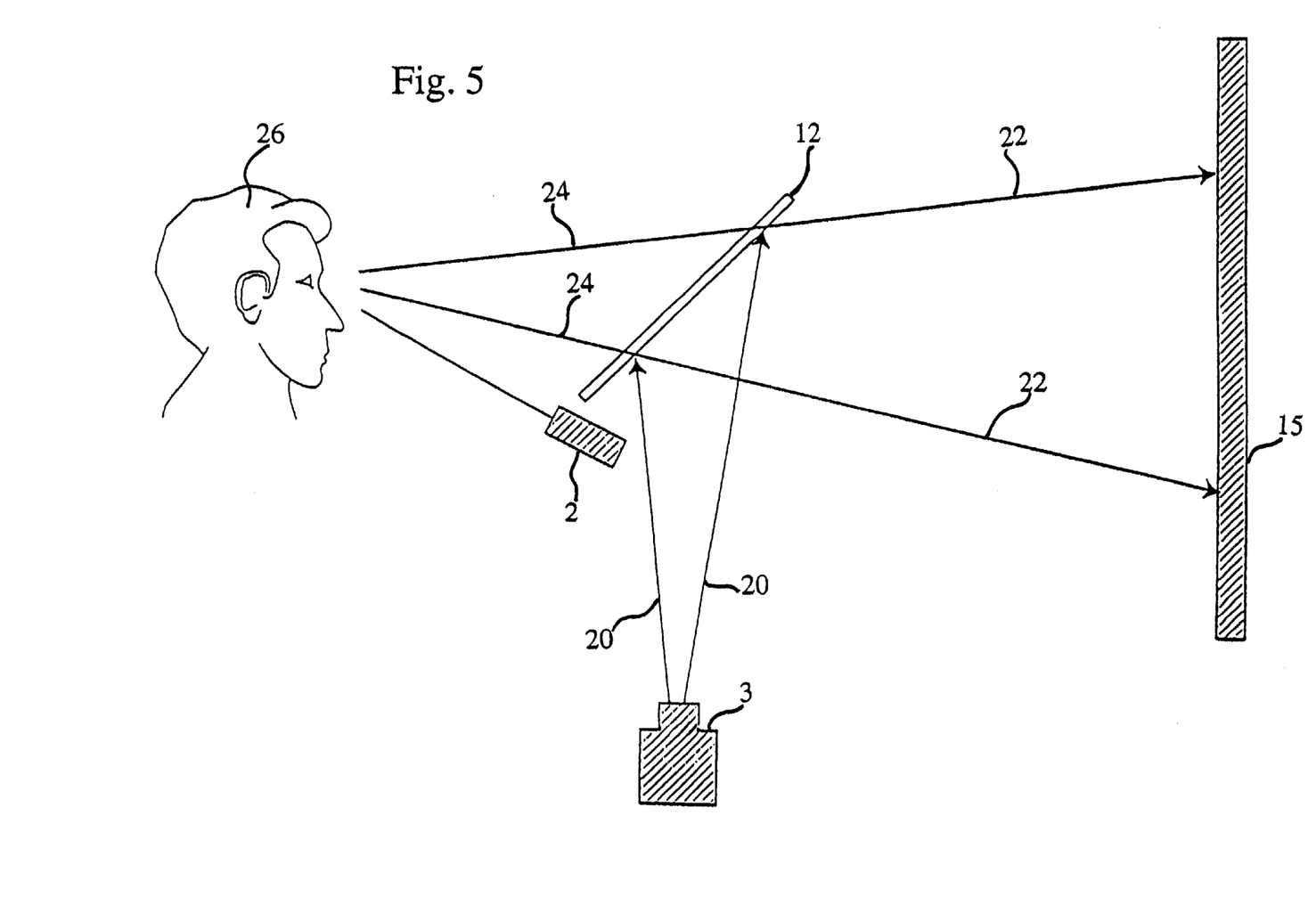
FIG. 5 shows a viewer system including vertical screen with imaging system mounted below.

The unique characteristics of the retro-reflective screen (15) make the present display system possible. Incident light is reflected from the retroreflective screens (15) surface substantially 180 degrees to the incident angle. In other words the projected light is turned around on itself. As can be seen in FIG. 4a, the retro-reflective screen (15) can be formed by a number of glass beads (16), wherein the properties of each bead (16) enable light striking each bead to be reflected back at substantially 180° to the angle of incidence of the light. FIG. 4b depicts the projected light (20) reflected by a single glass bead (16) as reflected light (22). The overall display system harnesses this characteristic by using a semi-reflective mirror (12) as the viewing apparatus directing the images to the viewer's eyes along the same optical axis as the projected light. For smaller screen sizes (less than 100") the retro-reflective screen (15) may be flat and for larger screen sizes it may be curved slightly both horizontally and vertically to optimise the image intensity to the viewer.

For a 3D application the viewer has an imaging system that projects a pair of images via a semi-reflective mirror (12) on to a retro=reflective screen (15). The image pair is projected to the viewer's and only the viewer sitting in front of the imaging system can see the stereoscopic images. The viewer's (26) line of sight (24) thus converges with the path of the reflected light (22). The eyetracking system tracks this viewer's eye position and through a servo mechanism modifies the path of the projected light to allow the image to remain over a region occupied by the viewer's eyes. It will be appreciated that a 2D system will operate in the same way, with the exception that both images to the left and right eyes are the same. Alternatively, a single image can be projected to both eyes, as opposed to two identical images being projected.

If no optical focussing system (1) is used in an application then mechanical or electronic movement of projection systems components within the imaging system is performed to produce modification of the light path of the projected image pair. When the optical focussing system (1) is installed in the imaging system then the light path of the projected image pair is modified by mechanical or electronic movement of optical elements within the optical focussing system (1).

Because no enclosure is required to house the retro-reflective screen (15) together with the imaging system, the size of the retro-reflective screen (15) can be any size. The only restriction being the intensity of the projection light.

The viewer is preferably located near the imaging system otherwise the size of the semi-reflective mirror (12) becomes too large and the eyetracking system has difficulty in tracking the viewer's eyes. The closer the viewer is to the imaging system the smaller the semi-reflective mirror (12) for a given retro-reflective screen (15) size. A comfortable viewing distance is 600–750 mm from the imaging system with the size of the semi-reflective mirror (12) being less than one square meter for a 100 inch diagonal retro-reflective screen (15).

By altering the position of the imaging system a viewer can see stereoscopic images anywhere within an optimum viewing zone defined by the size and the optical characteristics of the particular retro-reflective screen (15) used.

Figure 6:
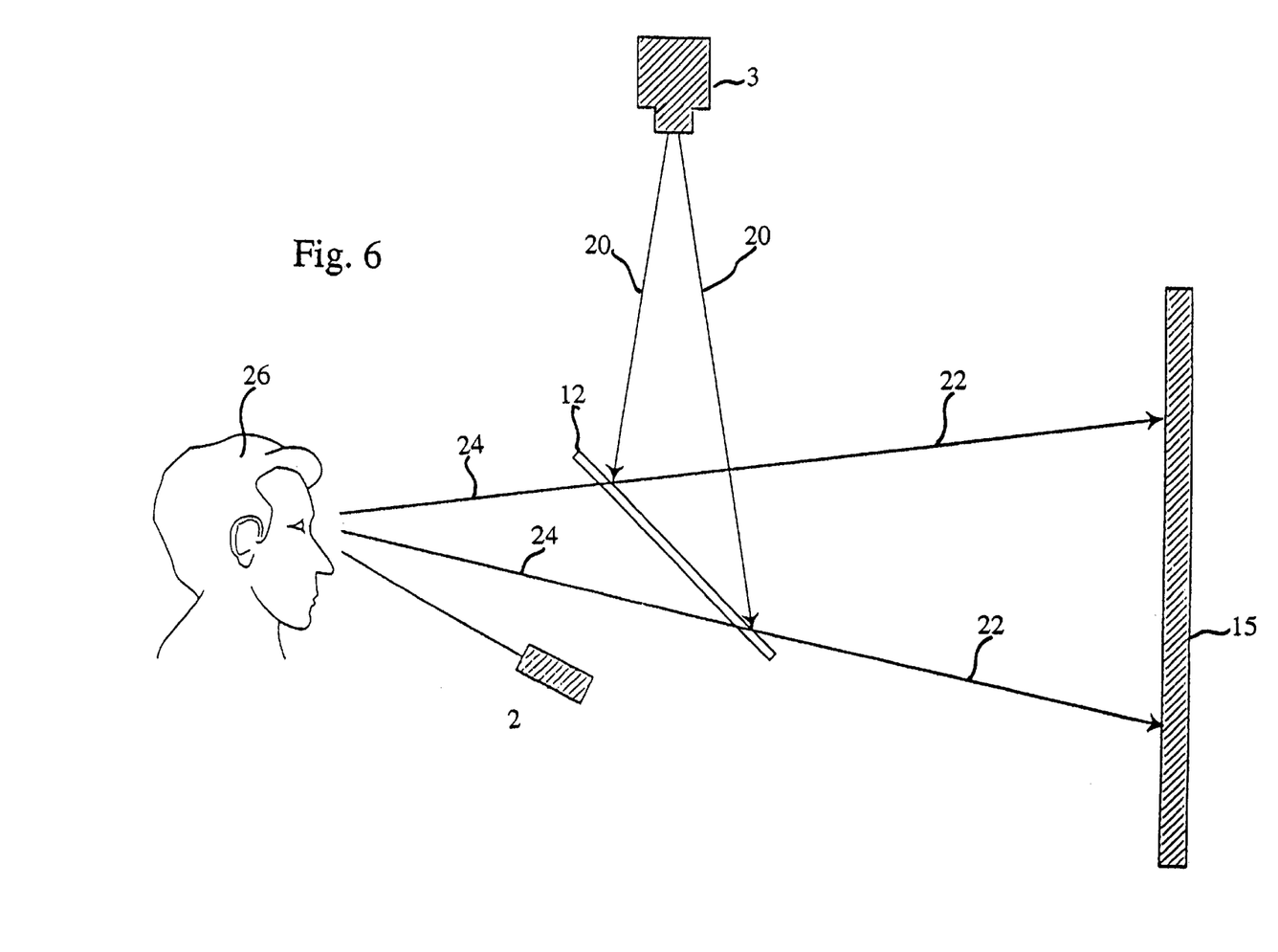
FIG. 6 shows a viewer system including a vertical screen with imaging system in an alternative arrangement.
Figure 7:
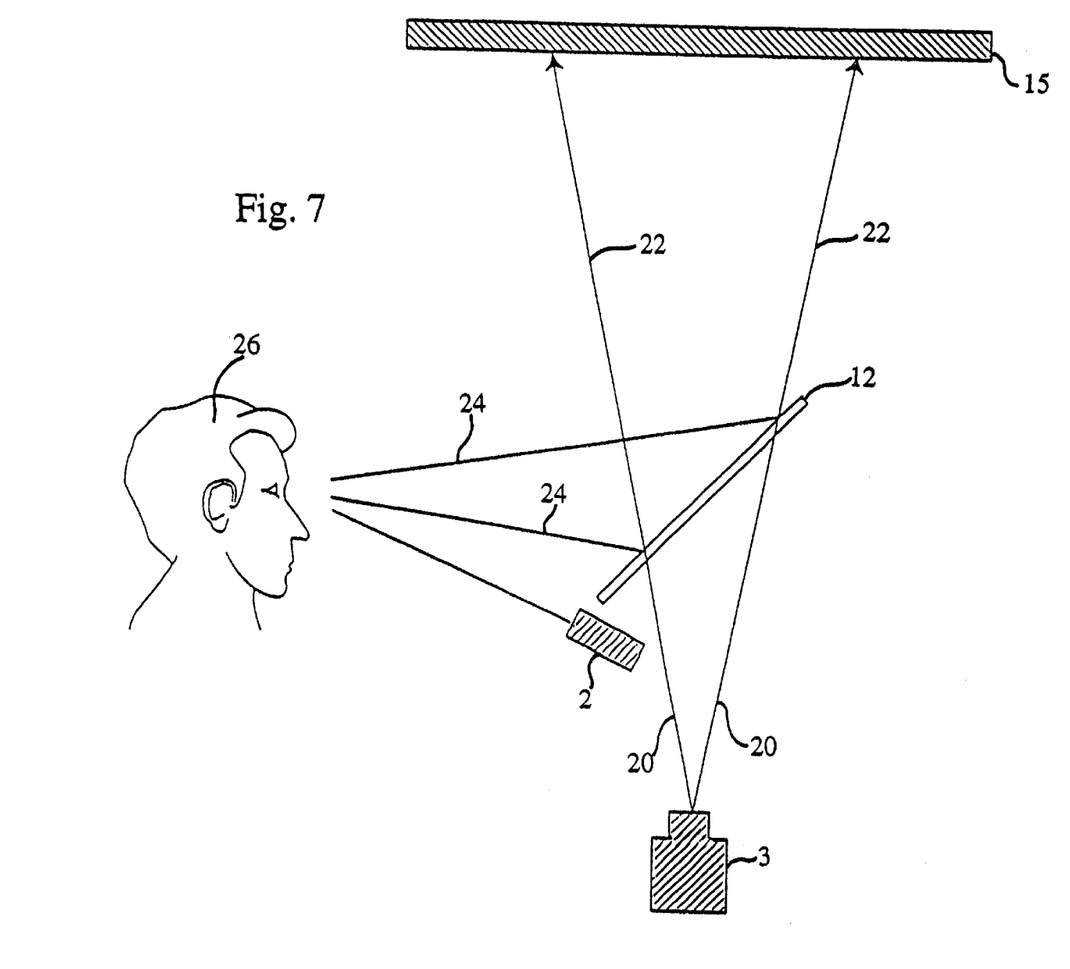
FIG. 7 shows a viewer system including a horizontal screen.
Figure 8:
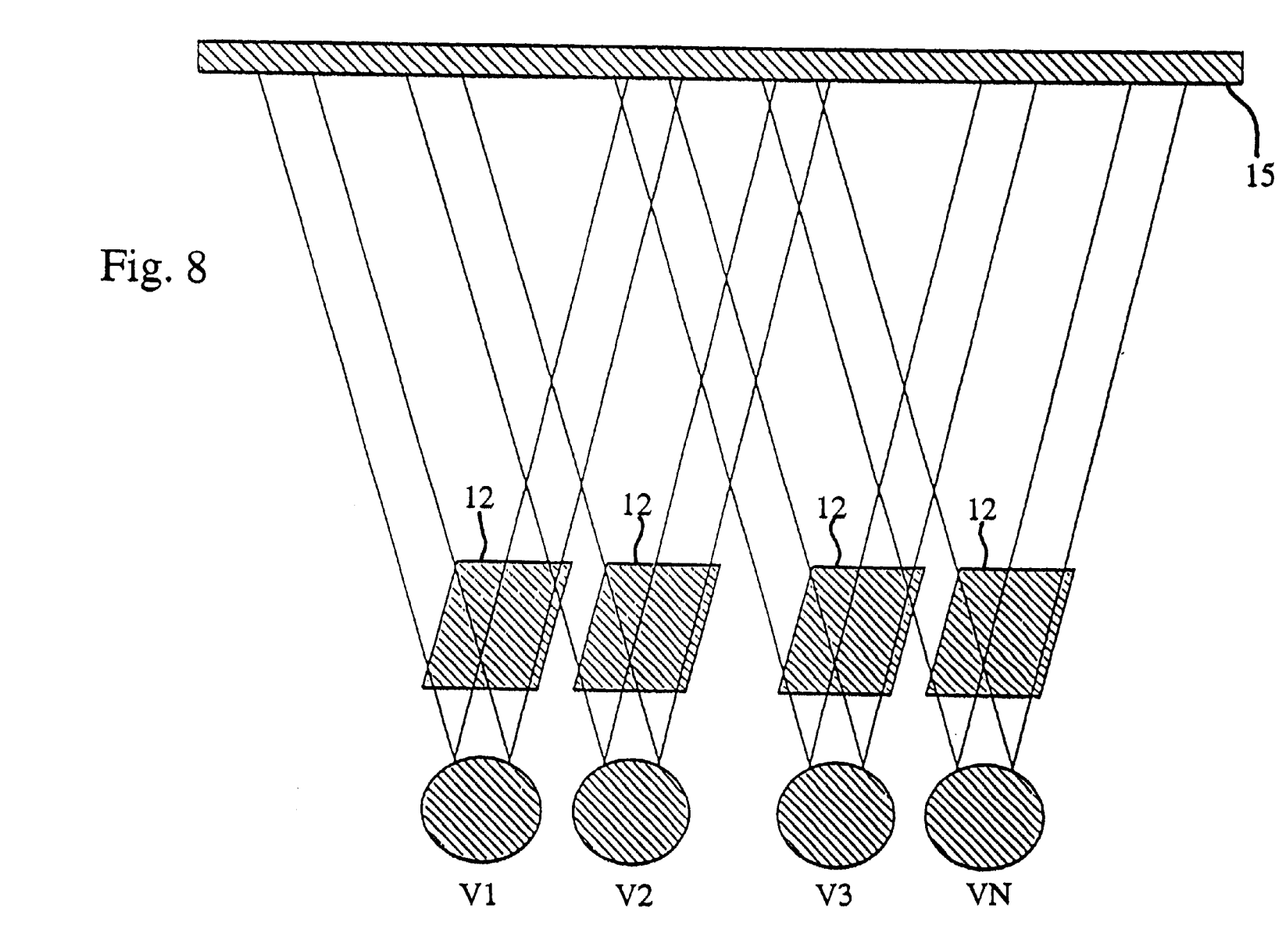
FIG. 8 shows a multiviewer system.

The retro-reflective screen (15) may be located in any position providing the angle to the semi-reflective mirror (12) remains substantially at 45 degrees to the screen plane but preferably it should be positioned in either a vertical or horizontal position, as shown in FIGS. 6 and 7 respectively. In the vertical position, for example mounted on a wall, the viewer has to remain in front of the screen while in a horizontally mounted screen set up a viewer can occupy any position on the floor providing the projected image pair doesn't overlap the edges of the screen. There are very distinct advantages in mounting the retro-reflective screen (15) horizontally for some applications.

As stated, the retro-reflective screen (15) has a unique property in that it reflects back much of the incident light at substantially 180 degrees to the incident angle. If many viewers each had their own Imaging System and preferably their own semi-reflective mirror (12) then each viewer would see the projected images from his own system and not from another source. For example if 10 people shone torches at eye level towards a retro-reflective screen (15), with each torch emitting a different colour of light, all 10 people would only see their colour of light. Light of too high an intensity will generally result in extreme crosstalk and make for an unpleasant visual experience with each viewer seeing mixed images. By reducing the projected image intensity to optimum levels to suit the particular retro-reflective screen (15) in use then crosstalk can be maintained to a minimum. This configuration also allows multiple images to be projected on to a retro-reflective screen (15) so that many viewer's see a different image without interfering with another viewer.

That is, the present invention allows for a plurality of viewers to be viewing the same screen at the same time, without necessarily seeing the same image. Further, not all of the projected images need be in 3D or 2D, that is, some viewers may view an image in 2D while other viewers could view an image in 3D.

Figure 9:
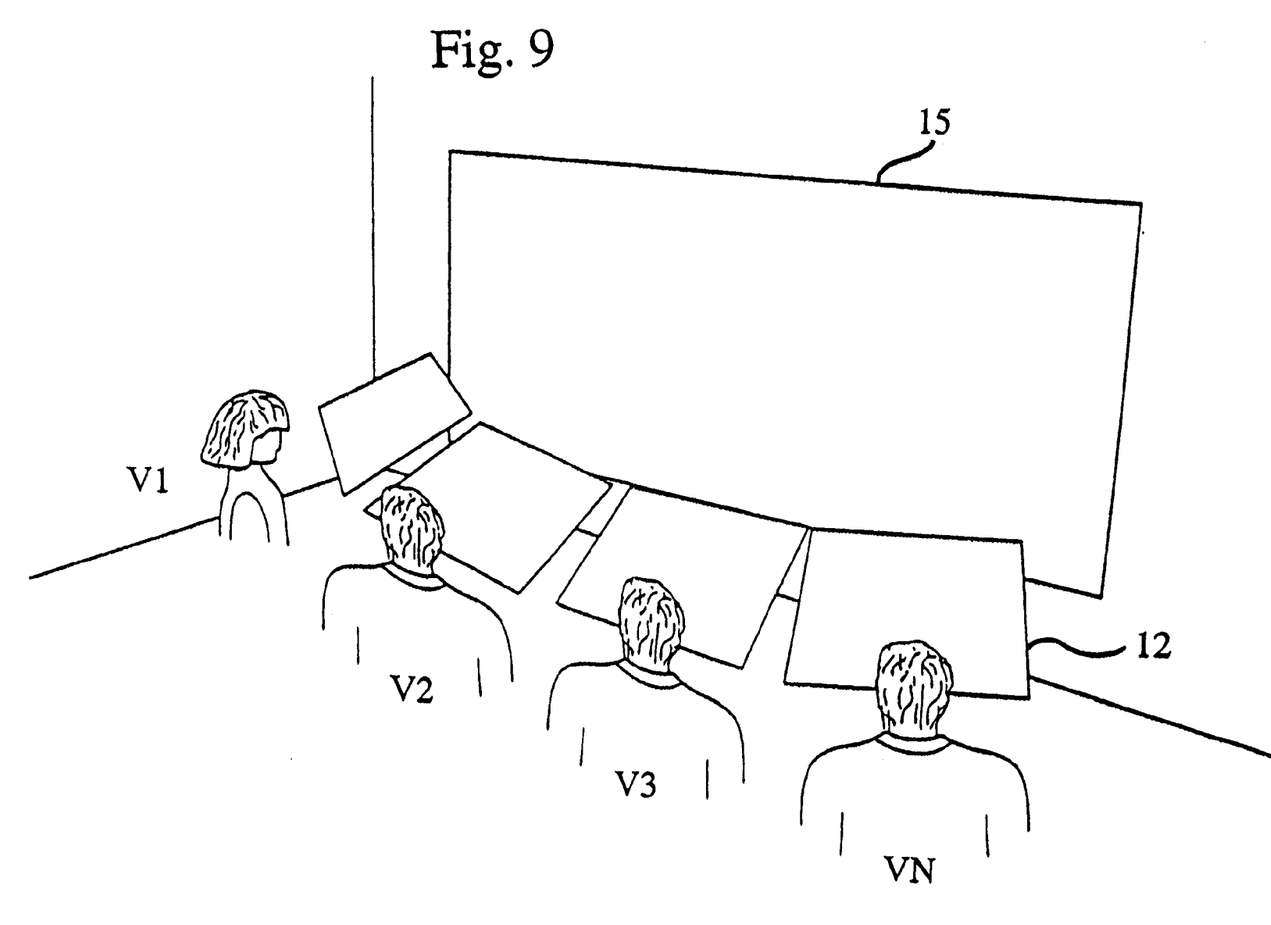
FIG. 9 shows an example of a multiviewer arrangement.

For this multiviewer arrangement, an optical imaging means is included for each viewer, and preferably a semi-reflective mirror would also be provided for each viewer, as shown in FIG. 9 for example. In operation each tracking means determines the location of the eyes of its respective viewer. The feedback from each tracking means being utilised by the focussing means to ensure that the images from each viewers projection means are directed towards that viewers eyes. The operation of the present multiviewer system allows a plurality of viewers to view their respective images. Whether these images are identical for each viewer is irrelevant, and will depend on the particular application. For example, each viewer may see the same image, each viewer may see a totally different image, or some viewers may see the same image and other viewers may see different images.

Because the viewers only see their Imaging System light source any other externally lit real objects can be viewed as foreground objects to a 3D video background making the scene come alive.

Modifications and variations such as would be apparent to a skilled addressee are considered within the scope of the present invention as defined.

The claims defining the invention are as follows:

1. A multiple viewer display system for a plurality of viewers including at least one semi reflective mirror, a retroreflective screen, and a plurality of optical imaging means, each viewer being provided with a respective said optical imaging means, each optical imaging means including a projection means for projecting images along an optical path, a tracking means for determining a spatial position of said respective viewer's eyes, and a focussing means for modifying the optical path in response to movements of the respective viewer.

2. A multiple viewer display system as claimed in claim 1, wherein at least one said projection means is adapted to project left and right eye images along the optical path to the respective viewer to thereby form a stereoscopic image.

3. A multiple viewer display system as claimed in claim 1, wherein at least one said projection means is adapted to project identical left and right eye images along the optical path to the respective viewer to thereby form a monoscopic image.

4. A display system as claimed in claim 1, wherein at least one said focussing means includes at least one lens which is capable of being repositioned to direct the projected image to the required position.

5. A display system as claimed in claim 1, wherein at least one said focussing means includes at least one mirror which is capable of being repositioned to direct the projected image to the required position.

6. A display system as claimed in claim 1, wherein at least one said tracking means includes a video camera coupled with an infrared bandpass filter.

7. A display system as claimed in claim 6, wherein the semireflective mirror includes at least one infrared light source; the infrared light source being directed towards the viewer eyes to enable the tracking means to track the viewers eyes through reflection of the infrared light.

8. A multiple viewer display system as claimed in claim 1, wherein a single semireflective mirror is provided for all said viewers.

9. A multiple viewer display system as claimed in claim 1, wherein each said viewer is provided with a respective semireflective mirror.

10. A display system as claimed in any preceding claim, wherein said retroreflective screen is substantially vertical in orientation.

11. A display system as claimed in any one of claims 1 to 9 wherein said retroreflective screen is substantially horizontal in orientation.

12. A display system as claimed in any one of claims 1 to 9 wherein said retroreflective screen is curved.

13. A display system as claimed in any one of claims 1 to 9 wherein at least one said optical imaging means projects a different image from its projection means.

14. A display system as claimed in any one of claims 1 to 9 wherein the or each semi-reflective mirror is at an angle of substantially 45° relative to the retroreflective screen.

15. A display system as claimed in one of claims 1 to 9 claim wherein the spatial position of a first image on the retroreflective screen from one optical imaging means overlaps with the spatial position of a second image from at least one other optical imaging means.

16. A display system as claimed in any one of claims 1 to 9 wherein at least one said projection means is adapted to project a single image along an optical path, said single image being capable of covering both eyes of a viewer.

* * * * *